No. 762,325. PATENTED JUNE 14, 1904.
C. W. KRESSE.
TRACTION WHEEL.
APPLICATION FILED APR. 4, 1904.
NO MODEL.
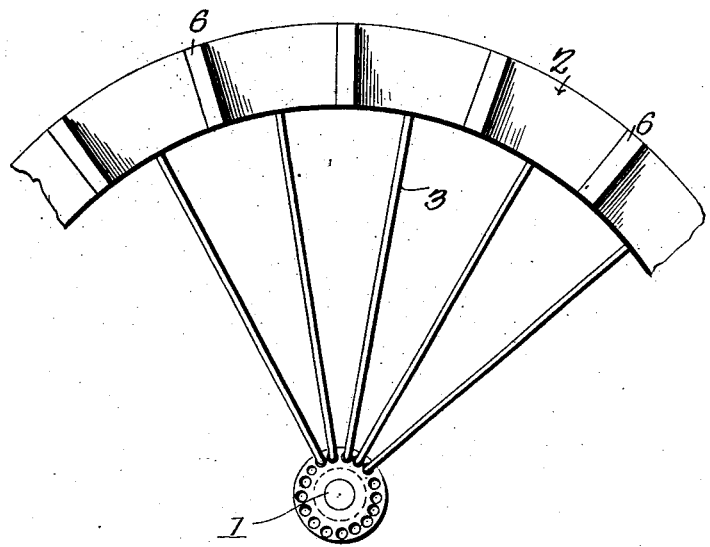
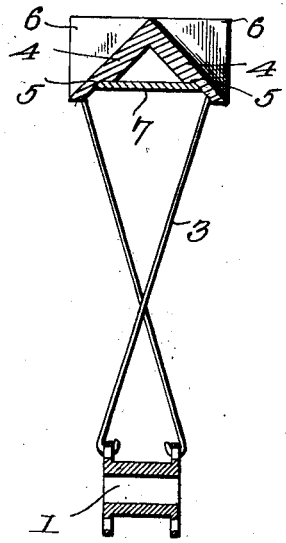
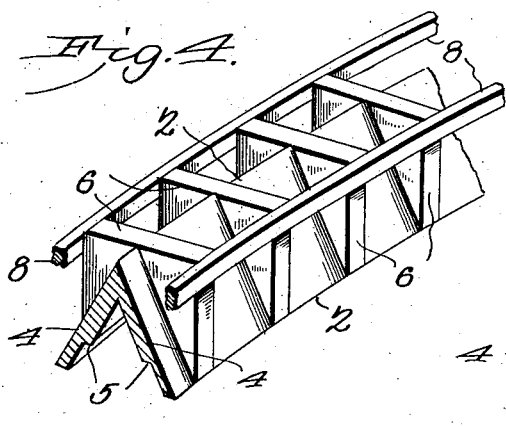
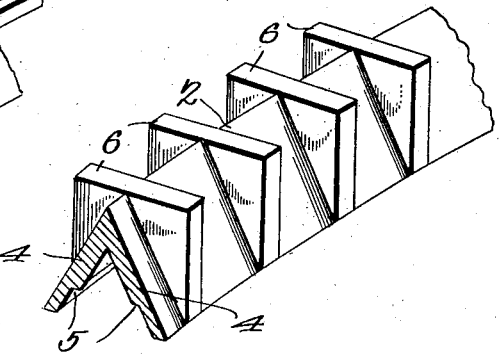
Witnesses
Charlie W. Kresse,
Inventor.
by C. A. Snow & Co
Attorneys No. 762,325.

Patented June 14, 1904.

UNITED STATES PATENT OFFICE.

CHARLIE W. KRESSE, OF LATHAM, ILLINOIS.

TRACTION-WHEEL.

SPECIFICATION forming part of Letters Patent No. 762,325, dated June 14, 1904.

Application filed April 4, 1904. Serial No. 201,544. (No model.)

*To all whom it may concern:*

Be it known that I, CHARLIE W. KRESSE, a citizen of the United States, residing at Latham, in the county of Logan and State of Illinois, have invented a new and useful Traction-Wheel, of which the following is a specification.

My invention relates to traction-wheels such as are employed on road-engines, agricultural implements, and the like, and has for its objects to produce a simple inexpensive device of this character in which liability of the traction members or cleats upon the tread of the wheel becoming clogged is wholly obviated.

With these and other objects in view the invention comprises the novel features of construction and combination of parts more fully hereinafter described.

In the accompanying drawings, Figure 1 is a view of a portion of a traction-wheel embodying my invention. Fig. 2 is the transverse sectional elevation of the wheel-rim. Fig. 3 is a detail perspective view of the latter. Fig. 4 is a detail perspective view illustrating a slightly-different form of embodiment of the invention.

Referring to the drawings, 1 designates the hub, 2 the rim, and 3 the spokes, of a traction-wheel, these parts, with the exception of the rim, being of the usual construction and material, inasmuch as they constitute no part of my invention.

The rim 2, constituting the subject of this invention, is constructed in any appropriate manner from iron, steel, or other suitable material and is preferably of substantially V shape in cross-section, thereby presenting a pair of outwardly-converging plano walls or portions 4, producing between them an inner groove or channel 5, which extends wholly and circumferentially around the rim 2, there being provided upon the outer face or tread of the rim a series of traction members or cleats 6, disposed at uniformly-spaced intervals around and throughout the entire circumference of the rim.

The inner groove or channel 5 is preferably bridged between the walls 4 by a thin light sheet-metal plate or shield 7, which is secured in place in any appropriate manner and extends wholly around the wheel, thus preventing the entrance and lodgment of sand or other foreign matter within the channel, while the traction cleats or lugs 6, which are preferably formed integral with the rim, are arranged directly across the latter transversely and are of a length approximately equaling the extreme breadth of the rim and of a width substantially equaling the depth of the latter, whereby the vertical end edges of the cleats will extend in a plane approximately parallel with the plane of the side edges of the rim, while the outer horizontal edges of the members will lie and extend in a plane substantially flush with the outer apex of the rim-walls.

It is apparent from the foregoing that as the wheel tread in practice travels over the ground-surface it will cut or embed itself into the latter, thereby insuring the members or cleats 6 taking firm hold to prevent slipping or lost motion of the wheel and that during this action the soil which enters the spaces between the traction members will pass freely up the inclined walls of the rim, and thus be prevented from lodgment between and clogging the traction-cleats.

In order to guard against possibility of the corners of the members 6 being broken off in practice, I have illustrated in Fig. 4 a slight modification in the construction and in which protecting members or strips 8 are extended between the traction members at the corners thereof, these members being formed integral with or attached in some appropriate manner to the cleats, as may be found desirable in practice.

From the foregoing it will be seen that I produce a simple inexpensive device which in practice will efficiently perform its functions to the attainment of the ends in view, it being understood, however, that minor changes in the details herein set forth may be resorted to without departing from the spirit of the invention. For example, while I have herein shown and described, and preferably employs a rim of substantially V shape in cross-section it is to be understood that the device is susceptible of modifications in this particular and that a rim of any cross-sectional form in which the outer face or tread of the rim recedes from a point between and toward its side edges may be employed within the range of my invention.

Having thus described the invention, what is claimed is—

1. In a traction-wheel, the combination with a rim of substantially V shape in cross-section and having an inner channel, of a shield bridging said channel between the walls of the rim, and traction members carried by and projecting from the outer face of the latter.

2. In a traction-wheel, the combination with a hollow rim having its outer face or tread in cross-section receded from a point between and toward its side edges, of a shield bridging the inner channel of the rim between the walls of the latter, and traction members carried by and projecting from the outer face of the rim.

3. In a traction-wheel, the combination with a rim having its outer face or tread in cross-section receded from a point between and toward its side edges, of traction members disposed upon and projecting from said tread, and protecting members extending between the traction members.

In testimony that I claim the foregoing as my own I have hereto affixed my signature in the presence of two witnesses.

CHARLIE W. KRESSE.

Witnesses:
   HORATIO A. HOOVER,
   BENJAMIN ALEXANDER.